US008290918B1

(12) United States Patent
Ioffe

(10) Patent No.: US 8,290,918 B1
(45) Date of Patent: Oct. 16, 2012

(54) ROBUST HASHING OF DIGITAL MEDIA DATA

(75) Inventor: Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 274 days.

(21) Appl. No.: 12/569,827

(22) Filed: Sep. 29, 2009

(51) Int. Cl.
*G06F 7/00* (2006.01)
*G06F 17/00* (2006.01)
(52) U.S. Cl. ...................................................... 707/698
(58) Field of Classification Search .................. 707/698
See application file for complete search history.

(56) References Cited

U.S. PATENT DOCUMENTS

| | | | | |
|---|---|---|---|---|
| 6,085,249 A * | 7/2000 | Wang et al. | ........... | 709/229 |
| 6,434,662 B1 * | 8/2002 | Greene et al. | ........... | 711/108 |
| 7,096,271 B1 * | 8/2006 | Omoigui et al. | ........... | 709/231 |
| 7,130,446 B2 * | 10/2006 | Rui et al. | ........... | 382/103 |
| 7,240,207 B2 * | 7/2007 | Weare | ........... | 713/176 |
| 7,991,206 B1 * | 8/2011 | Kaminski, Jr. | ........... | 382/124 |
| 7,991,770 B2 | 8/2011 | Covell et al. | | |
| 8,010,511 B2 | 8/2011 | Brock et al. | | |
| 8,156,132 B1 | 4/2012 | Kaminski | | |
| 2005/0102707 A1 * | 5/2005 | Schnitman | ........... | 725/135 |
| 2007/0019836 A1 * | 1/2007 | Thorwirth | ........... | 382/100 |
| 2007/0133878 A1 * | 6/2007 | Porikli et al. | ........... | 382/190 |
| 2007/0143526 A1 * | 6/2007 | Bontempi | ........... | 711/100 |
| 2008/0250328 A1 * | 10/2008 | Konttinen | ........... | 715/747 |
| 2009/0052784 A1 | 2/2009 | Covell et al. | | |
| 2009/0282020 A1 * | 11/2009 | McSheffrey et al. | ........... | 707/5 |
| 2011/0273455 A1 | 11/2011 | Powar et al. | | |

OTHER PUBLICATIONS

U.S. Appl. No. 11/765,292, filed Jun. 19, 2007, 39 pages.
U.S. Appl. No. 12/042,138, filed Mar. 4, 2008, 38 pages.
U.S. Appl. No. 12/237,397, filed Sep. 25, 2008, 34 pages.
U.S. Appl. No. 12/697,880, filed Feb. 1, 2010, 32 pages.
U.S. Appl. No. 12/536,907, filed Aug. 6, 2009, 51 pages.
Gollapudi, S., et al., "The power of two min-hashes for similarity search among hierarchical data objects," Symposium on Principles of Database Systems, Proceedings of the twenty-seventh ACM SIGMOD-SIGACT-SIGART symposium on Principles of database systems, Jun. 9-12, 2008, pp. 211-220.
Charikar, M., "Similarity Estimation Techniques from Rounding Algorithms," STOC'02, May 19-21, 2002, Montreal, Quebec, Canada, 9 Pages.
Chum, O., et al., "Near Duplicate Image Detection: min-Hash and tf-idf Weighting," In BMVC, 2008, 10 Pages.

* cited by examiner

*Primary Examiner* — Tony Mahmoudi
*Assistant Examiner* — Muluemebet Gurmu
(74) *Attorney, Agent, or Firm* — Fenwick & West LLP

(57) ABSTRACT

A robust hashing method is applied to media data (e.g., video, image, and/or audio data), producing a hash output that is robust with respect to at least one attribute of the media data. A histogram is generated for the media data and the histogram is hashed using a weighted hashing procedure. The histogram can be derived from a plurality of randomized versions of the media file, each randomized version of the media file altered to a random extent with respect to the attribute. The histogram can also be derived from a plurality of feature descriptors computed for the media data that are coarsely encoded with respect to the attribute. The weighted hashing procedure includes assigning a weight to components of the histogram and applying a plurality of hash functions to a number of versions of each component, the number of versions based on the assigned weight.

32 Claims, 10 Drawing Sheets

ROBUST HASHING OF DIGITAL MEDIA DATA

BACKGROUND

1. Field of Art

The disclosure generally relates to comparing digital media data, and, more particularly, relates to comparing digital media data using robust hashing techniques.

2. Description of the Related Art

As the number of media files (files comprising media data such as image, video, and or audio data) included in typical collections has increased, so too has the importance of efficiently and reliably detecting near-duplicate media files. For example, online video hosting services that allow users to upload videos for viewing by other users can, over time, acquire a very large video database that includes many videos. Typically, many videos in the database are either exact or near-duplicates of other videos in the database. Accurately detecting near-duplicate videos within the database improves system performance by, for example, improving the ability of the online video hosting service to manage its video inventory, provide better searches, and offer faster overall response time.

However, conventional near-duplicate detection and hashing schemes are not acceptably reliable when dealing with near-duplicate media files that are spatially or temporally cropped versions of one another. As used herein, a cropped version of a first media file is a second media file that includes media data which represents only a portion of a spatial or temporal extent of the media content represented by the media data of the first media file. For example, a first image file may have a size of 800×600 pixels, and a second image file may be cropped on one side to produce a final size of 600×600 pixels. Such spatial crops cause position information associated with transform coefficients and feature descriptors for the two image files to be incongruous because information for the cropped area is no longer included and/or the relative offsets of features are altered. The outputs of conventional hashing schemes are unacceptably sensitive to these variations, hindering the effectiveness of conventional near-duplicate detection techniques. Similar cropping-based incongruities can arise when near-duplicate videos have different aspect ratios or surrounding margins. Temporal crops arise when audio or video files include similar content but have different durations, causing incongruous temporal information associated with transform coefficients and feature descriptors. For example, a temporal crop of an audio file (e.g., eliminating the first or last ten seconds of content) can result in an altered distribution of frequency domain coefficients relative to the original audio file.

SUMMARY

A computer-implemented method applies a robust hashing method to media data (e.g., video, image, and/or audio data) included in one or more media files. In one implementation, a computer-readable storage medium can store computer-executable code that, when executed by a processor, causes the processor to implement the robust hashing method. The robust hashing method comprises generating a histogram based on feature information derived from the media data and hashing the histogram using a weighted min-hash procedure.

The histogram is stored in a computer memory comprising a computer-readable storage medium and encodes a frequency of occurrence for at least one feature of the media data. In one embodiment, the histogram comprises a plurality of bins, each bin specifying a set of features of the media data. Each bin is also associated with a count that indicates how many times the set of features specified by the bin occurs in the media data.

The histogram for the media file can be generated in a variety of ways. In some embodiments, the histogram is a version-based histogram derived from a plurality of randomized versions of the media file. Each randomized version of the media file is altered to a random extent with respect to an attribute of the media data, such as an amount of media data cropped from the media file. A set of hash functions is then applied to each randomized version, producing a plurality of output values. Hence, in a version-based histogram, each bin specifies a particular hash function and a particular output value. The count for a bin comprises a number that indicates how many randomized versions resulted in the specified output value when input to the specified hash function. For example, one thousand randomized versions of the media file may be created and ten hash functions applied to each of the one thousand randomized versions, producing ten thousand output values. However, not all of the output values are unique. If applying the third hash function to each of the randomized versions results in an output value of 42 for fifteen of the randomized versions, then a count of fifteen is stored in association with a bin that specifies the third hash function and an output value of 42. Thus, in the example embodiment described above, the count for a bin could be any number between one and one thousand.

The histogram can also be an encoding-based histogram derived from coarsely encoding an attribute of plurality of feature descriptors computed for the media data. The coarsely encoded attribute can comprise a position attribute that represents position information associated with the computed feature descriptors. In one embodiment, coarsely encoding the attribute comprises dividing a range of possible values for the attribute into a plurality of segments and, for each computed feature descriptor, determining a segment that includes the attribute and encoding an association with the determined segment for the computed feature descriptor. For example, a position attribute for feature descriptors can be coarsely encoded by associating each descriptor with a quadrant of an image rather than a precise position with the image. Hence, in an encoding-based histogram, each bin specifies a particular feature descriptor and a particular segment. The count for a bin comprises a number and indicates how instances of the specified feature descriptor are associated with the specified segment.

Hashing the histogram using a weighted min-hash procedure includes assigning a weight to each bin included in the histogram and applying a plurality of hash functions to a number of versions of each bin, the number of versions for a bin based on the assigned weight for the bin. For example, a first hash function is applied to the number of altered versions of each bin to generate a plurality of outputs for the first hash function, a smallest output is determined for the first hash function, and a first data element is stored that is representative of the altered version which yielded the determined smallest output for the first hash function. This process is repeated for each of the plurality of hash functions to produce a vector which beneficially characterizes the histogram (and therefore the associated media file) using a minimal amount of data (e.g., hundreds of bytes) and is robust to variations of media data in at least one dimension. In one embodiment, each of the plurality of hash functions are part of a family of seeded hash functions, each hash function having a different seed value. As used herein, a family of seeded hash function comprises a group of any related hash functions wherein each hash function associated with the group accepts a numeric seed value and outputs a hash value that is affected by the seed value as well as any additional input.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

System Overview

Figure 1:
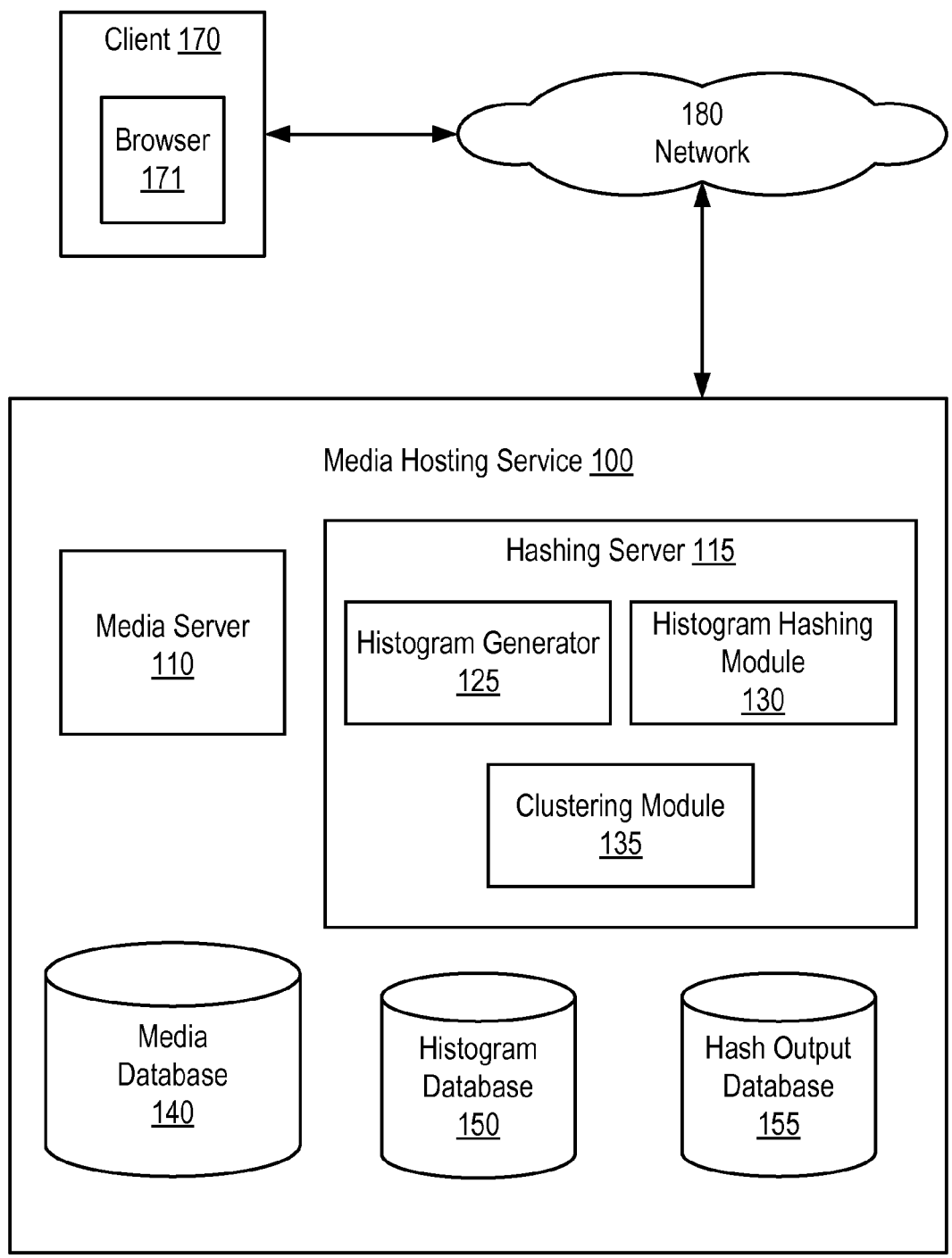
FIG. 1 illustrates a block diagram of one embodiment of a system for implementing robust hashing of media data.

FIG. 1 illustrates an exemplary computing environment that supports a system for robustly hashing media data. In the embodiment of FIG. 1, a media hosting service 100 communicates over a network 180 with one or more client devices 170, each client 170 including a browser 171. The media hosting service 100 includes a media server 110, a hashing server 115, a media database 140, a histogram database 150, and a hash output database 155. The media hosting service 100 receives uploaded media files (e.g., files comprising media data such as audio, video, or image data) from some of the clients 170 and provides media files to clients 170 for presentation by an appropriate media player application. The media hosting service 100 applies a robust hashing method to the media files in the media database 140. In one embodiment, the robust hashing method produces an output vector which characterizes a media file, and the media hosting service 100 employs a near-duplicate detection method in which the output vectors serve as fingerprints for the media files.

As used herein, a duplicate or near-duplicate media file is a media file stored by the media database 140 that is either identical or highly similar to at least one other media file in the media database 140. For example, two or more near-duplicate media files in the media database 140 can seem more or less identical to a viewer (e.g., two different recordings of the same television show), but one can be a spatial or temporal crop of the other (e.g., the first video lacks the leftmost 5% and/or the initial fifteen seconds of the second video).

The network 180 is typically the Internet, but can be any network, including but not limited to any combination of a LAN, a MAN, a WAN, a mobile, a wired or wireless network, a private network, or a virtual private network. Only a single client 170 is shown, but in practice there are many (e.g., millions) clients 170 that can communicate with and use the media hosting service 100. The browser 171 can include a media player (e.g., a video player compatible with the Flash™ platform from Adobe Systems, Inc.) adapted for the media file formats used by the media hosting service 100.

The media database 140, the histogram database 150, and the hash output database 155 are communicatively coupled to the network 180 and can be implemented as any device or combination of devices capable of persistently storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here.

The media server 110 and the hashing server 115 are also communicatively coupled to the network 180 and can be implemented as one or more server class computers. The server class computers can include one or more high-performance CPUs and 1 G or more of main memory, as well as 500 Gb to 2 Tb of storage. An open-source operating system such as LINUX is typically used. The operations of the media hosting service 100 as described herein can be controlled through either hardware (e.g., dedicated computing devices or daughter-boards in general purpose computers), or through computer programs installed in computer storage on the servers of the service 100 and executed by the processors of such servers to perform the functions described herein. One of skill in the art of system engineering and media data analysis will readily determine from the functional and algorithmic descriptions herein the construction and operation of such computer programs.

In one embodiment, the media server 110 receives media files uploaded by clients 170 over the network 180 and processes them for storage by the media database 140. The media server 110 also receives requests for media files from clients 170 through the network. In response to received requests, the media server 110 retrieves media files stored by the media database 140 and distributes them to clients 170 over the network 180. Some of the media files received and distributed by the media server 110 are duplicate or near-duplicate media files.

The media database 140 stores data for a plurality of media files. Each media file comprises media data representative of media content (e.g., video data, image data, or audio data). In one embodiment, the hashing server 115 processes media files stored in the media database 140 using a robust hashing method. In one embodiment, applying the robust hashing method to a media file comprises generating a histogram for the media file and subsequently hashing the histogram in a weighted manner. The hashing server 115 includes a histogram generator 125 to generate the histogram, a histogram hashing module 130 to hash the histogram, and a clustering module 135 to identify near-duplicate media files based on output vectors produced by the histogram hashing module 130.

The histogram generator 125 transforms the media data included in a media file to generate a histogram for the media file. The generated histogram is stored in the histogram database 150. The histogram encodes information about a number of occurrences for a particular feature of the media data. Depending upon the embodiment, the histogram generator 125 can employ a wide variety of histogram generation techniques. For example, the histogram generator 125 can generate a plurality of altered versions of the media file, wherein a particular attribute (e.g., spatial or temporal extent) of the media file is randomly altered for each version. The histogram can thereafter encode how many of the versions include a particular feature. Such a histogram is referred to hereinafter as a version-based histogram, and further details of version-based histogram generation are explained below in reference to FIGS. 2A-2D.

The histogram generator 125 can also apply a transform (e.g., a wavelet transform) or a feature detection algorithm (e.g., the SIFT algorithm) to the media data to generate feature data (e.g., transform coefficients or feature descriptors). The histogram can thereafter encode a number of resulting transform coefficients or feature descriptors as having a particular attribute within a segment of the range over which the attribute can vary. For example, the histogram generator 125 can apply a wavelet transform to an image, partition the image into a plurality of quadrants, and determine which quadrant corresponds to the position attribute of a resulting wavelet coefficient. Thus, the wavelet coefficient has been "coarsely encoded" with respect to its position attribute, and rather than utilize the precise position of a wavelet coefficient, subsequent operations of the histogram generator 125 can utilize the coarse position of the wavelet coefficient (to which quadrant the wavelet coefficient corresponds) as feature data. A histogram can encode how many wavelet coefficients of a particular type for the image have a position attribute within each quadrant. Such a histogram is referred to hereinafter as an encoding-based histogram, and further details of encoding-based histogram generation are explained below in reference to FIGS. 3A-3C.

The histogram hashing module 130 applies a weighted hashing procedure to a histogram generated by the histogram generator 125. In one embodiment, the histogram includes a plurality of bins, each bin specifying a set of features and having an associated count. The bins are assigned weights based at least in part on the associated count, the weight therefore indicating a prevalence of the specified features. The histogram hashing module 130 applies a hash function to a number of versions of each bin (e.g., a number of permutations of the data for the bin). The number of versions is based on the weight assigned to the bin, so that as the weight increases, the number of versions of the bin to which the hash function is applied increases as well. By applying the hash function to more versions of the higher-weighted bins, the robust hashing procedure can be more discriminative with respect to those features that are more prevalent in the media data. Furthermore the output vector produced by the weighted hashing procedure is robust (minimally sensitive to variations) with respect to at least the attribute which was randomly altered while generating a version-based histogram and with respect to at least the attribute which was coarsely encoded while generating an encoding-based histogram. Further details of the weighted hashing procedure are explained below in reference to FIGS. 4A-4C.

One embodiment of the clustering module 135 operates upon output vectors generated by the histogram hashing module 130. The clustering module 135 identifies output vectors that are substantially similar using one or more data clustering procedures. The clustering module 135 can then identify media files associated with similar output vectors as near-duplicate media files. In one embodiment, the clustering module 135 identifies a media file associated as a near-duplicate media file by appending or modifying metadata for the media file included in the media database 140. The metadata can identify one or more other media files as near duplicates of the media file. The metadata can also help the media hosting service 100, for example, provide improved searching and browsing capabilities (e.g., by not presenting to the user an excessive number of near-duplicate results in response to a query), propagate metadata among media files, or identify media files as suitable for various management policies (e.g., media files suitable for monetization via a particular advertisement or subscription policy, media files which should be eliminated from the media database 140, etc.). In one embodiment, the clustering module 135 utilizes a type of Hamming distance metric for multiple output vectors as part of identifying similar output vectors. Details of the clustering module 135 and the data clustering procedures employed thereby are provided below in reference to FIGS. 5A and 5B.

Numerous variations from the system architecture of the illustrated media hosting service 100 are possible. The components of the service 100 and their respective functionalities can be combined or redistributed. For example, the media database 140, histogram database 150, and/or hash output database 155 can be distributed among any number of storage devices. Furthermore, the functionalities ascribed herein to any of the histogram generator 125, histogram hashing module 130, and clustering module 135 can be implemented using a single computing device or using any number of distributed computing devices communicatively coupled via a network.

Version-Based Histogram Generation

Figure 2A:
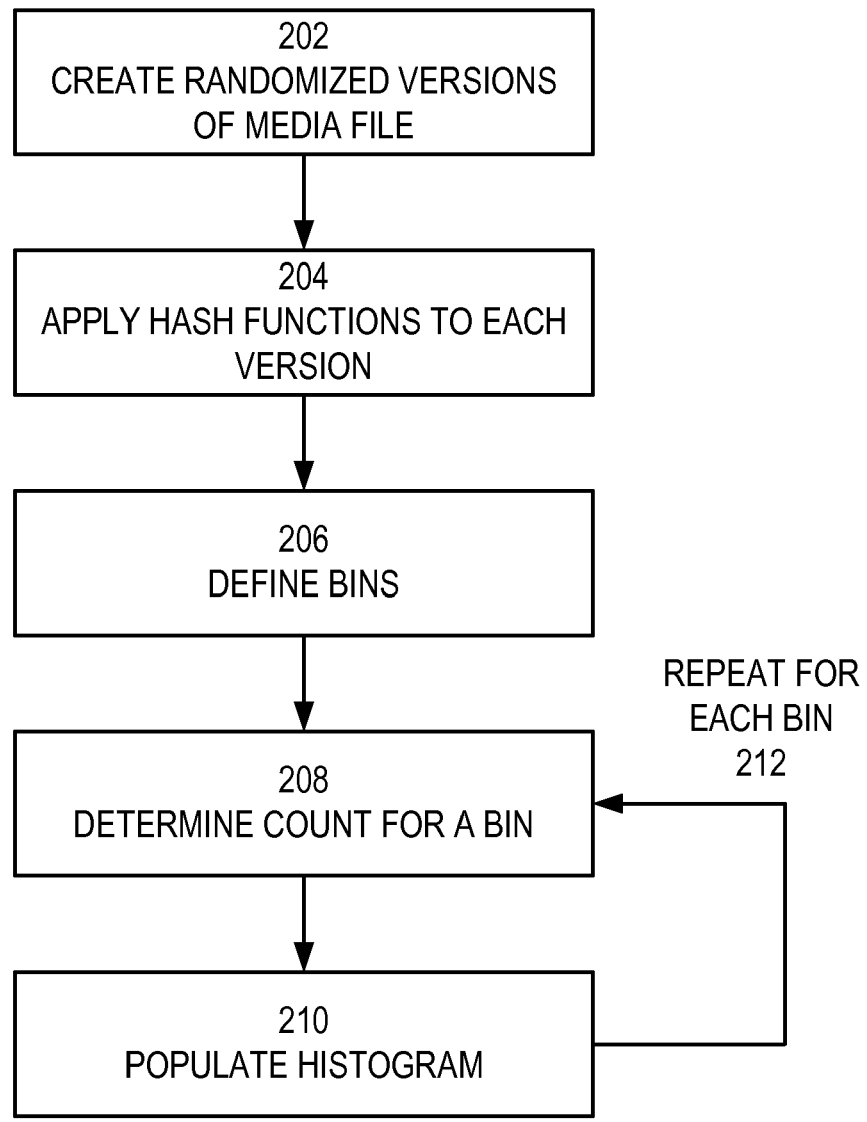
FIG. 2A illustrates one embodiment of a method for generating a histogram for a media file based on multiple versions of the media file.

FIG. 2A is a flowchart illustrating one embodiment of a process 200 implemented by the histogram generator 125 to generate a version-based histogram for a media file. Other embodiments can perform one or more steps of FIG. 2A in a different sequence. Moreover, other embodiments can include additional and/or different steps than the ones described herein.

The histogram generator 125 creates 202 multiple versions of the media file. At least one attribute (e.g., spatial or temporal extent) of the media file is randomly varied for each version. In one embodiment, one thousand randomized versions are created 202, but more or fewer versions can also be created 202. For example, the histogram generator 125 can create 202 one thousand versions of the media file, each version cropped a randomized percentage relative to the original media file. In general, the final output of the robust hashing procedure will be robust with respect to (i.e., minimally sensitive to variations in) that attribute which is randomized amongst the created 202 versions. The attributes that are varied are those of interest with respect to the goal of robustly identifying different near-duplicate versions of media files. Thus, if the goal is to identify differently cropped versions of media files, then the variations can be for spatial cropping. If the goal is to identify versions have various resolutions (e.g., downsampled and upsampled images), then the image resolution can be varied amongst the randomized versions. Versions of video data can also be randomized with respect to other attributes by altering perspective, geometrically rotating graphical elements within the video data, or applying a degree of blurring to graphical elements within the video data. Versions of audio data can be randomized by applying various degrees of pitch shifts or temporal distortions to the data. Also, any number of different manners of variation can be combined in each randomized version.

As an illustration of this approach, two example media files comprising near-duplicate images can be considered. Image A and image B both represent the same picture, but image B is a 10% crop of image A (e.g., 10% of image A is absent from image B). Conventional near-duplicate detection and hashing techniques typically fail to identify image A and image B as near duplicates due to, for example, cropping-related incongruities in the media data included therein. However, if the histogram generator 125 creates 202 many versions of image A which are cropped a random percentage, some of the created versions of image A will be more nearly identical to image B than the original image A. Moreover, many randomly created versions of image B will be identical or nearly identical to randomly created versions of image A (e.g., a 20% crop of image A will be nearly identical to an 11% crop of image B). Thus, as the histogram generator 125 processes the media files stored by the media database 140, many versions of each media file are created 202 which are randomized with respect to a particular attribute for which robustness is desired, resulting in at least some randomized versions with very high degrees of similarity for any near-duplicate media files. In one embodiment, randomization amongst the created 202 versions is restricted to a range of the attribute (e.g., crops are randomized within a range of 0-25%).

After creating 202 the randomized versions of the media file, the histogram generator 125 applies 204 a plurality of hash functions to each version. In one embodiment, the histogram generator 125 applies 204 ten (10) hash functions to each version, but more or fewer hash functions can be applied 204 in other embodiments. Thus, for one thousand randomized versions of the media file, applying 204 ten hash functions results in ten thousand hash function outputs. The applied hash function can be a conventional hash function such as, for example, a Jenkins hash function, a Bernstein hash function, a Fowler-Noll-Vo hash function, a MurmurHash hash function, a Pearson hashing function, or a Zobrist hash function. In one embodiment, the plurality of applied hash functions is obtained by applying 204 a given seeded hash function with the desired number (e.g., 10) different seed values. A seeded hash function can be described as a function that accepts two inputs, e.g., f(X,Y). The first input X is a set of data (e.g., 32 bits of data), and the second input Y is a seed value. The seed value is typically a number (e.g., 1, 2, 3 . . . ). The applied hash functions treat X and Y as a pair, outputting a hash value that is affected by both X and Y. The output of each applied hash function is a single real number, such as an integer. Also, the same seed values can be utilized when processing each media file to enhance comparability of the applied hash function outputs.

Figure 2B:
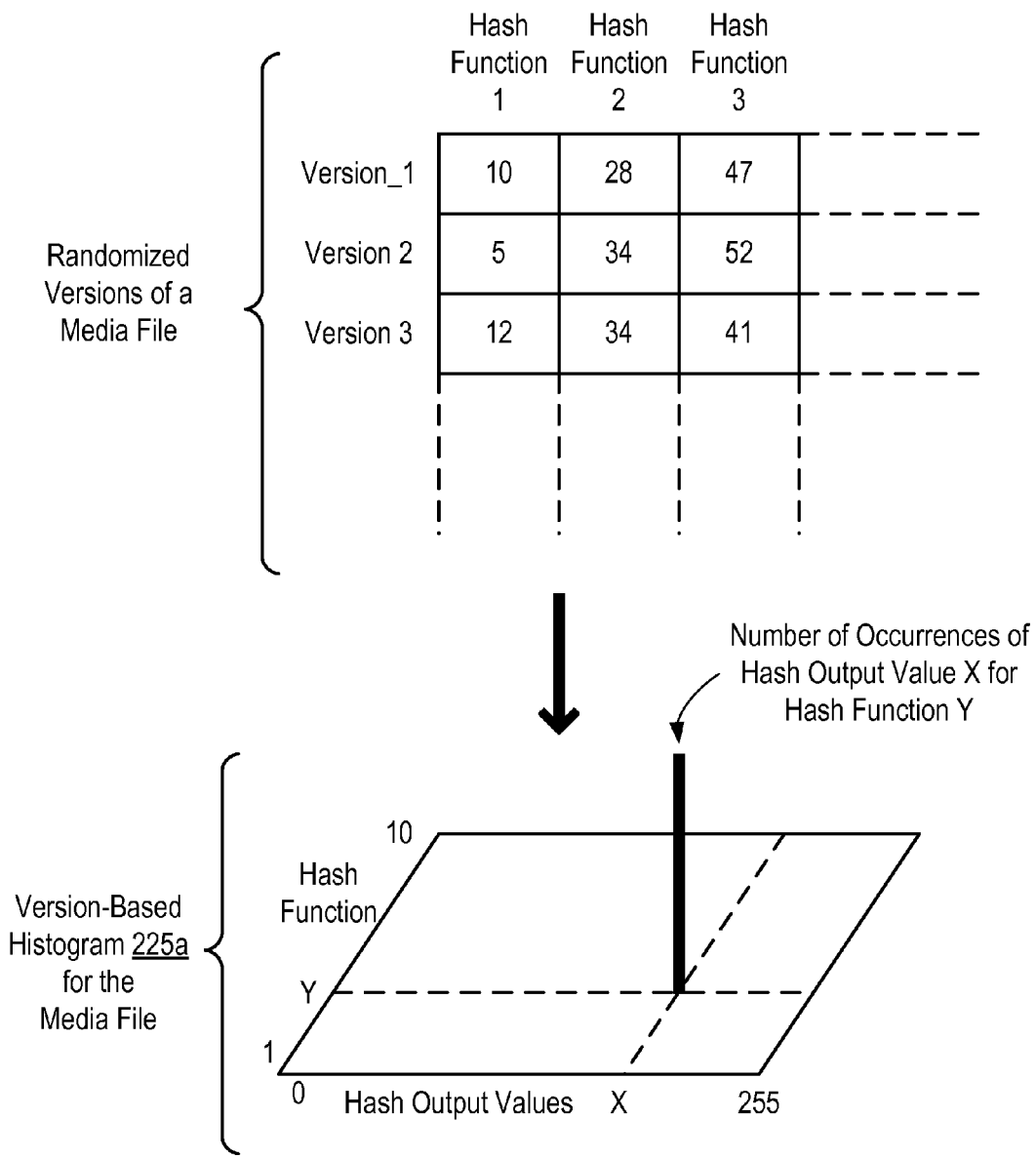
FIG. 2B illustrates further aspects of one embodiment of a method for generating a histogram for a media file based on multiple versions of the media file.

Referring now to FIG. 2B, the values output by the applied hash functions form the basis of a version-based histogram 225a generated for the media file by the histogram generator 125. The outputs of three hash functions as applied 204 to three randomized versions of a media file are illustrated in FIG. 2B. A small number of hash function outputs are illustrated for visual clarity. As indicated by the dashed lines in FIG. 2B, many more hash functions (e.g., 10) can be applied to many more randomized versions of the media file. Applying 204 the first hash function to the first three randomized versions produced output values of 10, 5, and 12 respectively. Applying 204 the second hash function to the first three randomized versions produced output values of 28, 34, and 34 respectively. Applying 204 the third hash function to the first three randomized versions produced output values of 47, 52, and 41 respectively.

The version-based histogram 225a encodes a number of randomized versions for which a particular hash function produced a particular output value. For example, as illustrated in FIG. 2B, the second applied hash function outputs a value 34 for at least two randomized versions of the media file (versions 2 and 3). Hence, in one embodiment, a version-based histogram 225a is a three-dimensional array that includes a hash function dimension which varies from 1 to 10 (for the histogram generator applying 204 ten hash functions), an output value dimension which varies from 0 to 255 (the output range of the hash function, with each output value encoded as a byte), and a number of occurrence dimension which varies from 0 to 1000 (the histogram generator creating one thousand versions of each media file). In other embodiments, the dimensions can vary over different ranges, as a different number of versions can be created 202, a different number of hash functions can be applied 204, and an output value can be encoded using a different amount of data.

Figure 2C:
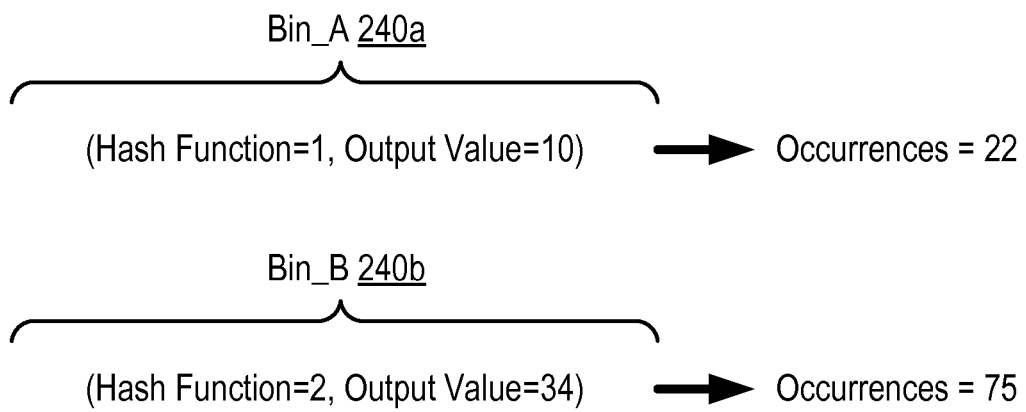
FIG. 2C illustrates bins for a histogram for a media file based on multiple versions of the media file according to one embodiment.

Referring to FIGS. 2A and 2C, the histogram generator 125 defines 206 a plurality of bins 240 based on the outputs of the applied 204 hash functions. By defining 206 bins 240 that represent two or more of the above-described histogram 225 dimensions, the histogram generator 125 can reduce any combination of dimensions included in a histogram 225 to a single dimension by encoding the combination of dimensions as a tuple or other suitable identifier. For example, as shown in FIG. 2C, a first bin Bin_A can correspond to a two-element tuple {Hash Function=1, Output Value=10} in which the first element identifies a first applied hash function and the second element indicates an output value of 10 for this hash function. Similarly, a second bin Bin_B can correspond to another two-element tuple in which the first element identifies a second applied hash function and the second element indicates an output value of 34. As part of defining 206 the bins 240, the histogram generator 125 can assign a bin identifier to each bin 240. For example, in the histogram 225 of FIG. 2D, the first bin 240a is assigned the identifier "A" and the second bin 240b is assigned the identifier "B". The dashed lines and vertical dots included in the histogram 225 indicate that more bins 240 have been defined 206 and assigned a corresponding identifier but are not shown to preserve illustrative clarity. In other embodiments, a bin identifier for a bin 240 can be the tuple corresponding to the bin 240 or any other manner of identifier suitable for uniquely denoting the bin 240.

The histogram generator 125 determines 208 a count for each bin 240 and populates 210 the histogram 225 with the determined count. For example, in FIGS. 2C and 2D, the histogram generator 125 has determined a count of "22" for the first bin Bin_A, indicating that the first hash function yielded an output value of 10 for 22 of the randomized versions of the media file that were created by the histogram generator 125. The histogram generator 125 has also determined 208 a count of "75" for the second bin Bin_B, indicating that that the second hash function yielded an output value of 8 for 75 of the randomized versions of the media file that were created by the histogram generator 125. Thus, in one embodiment, determining a count for a bin 240 comprises determining a number of occurrences dimension for a particular output value of an applied 204 hash function.

The histogram generator 125 repeats 212 the determining and populating steps for each defined 206 bin associated with the media file to complete the histogram 225 for the media file. Hence, in one embodiment, the histogram 225 for the media file is a multi-dimensional array with at least a first dimension corresponding to a plurality of bins, each bin representing a set of one or more features of the media file (e.g., randomized versions of the media file which result in a particular output value when input to a particular hash function), and at least a second dimension corresponding to a plurality of bin counts, each bin count representing a number of occurrences for an associated bin.

Encoding-Based Histogram Generation

Figure 3A:
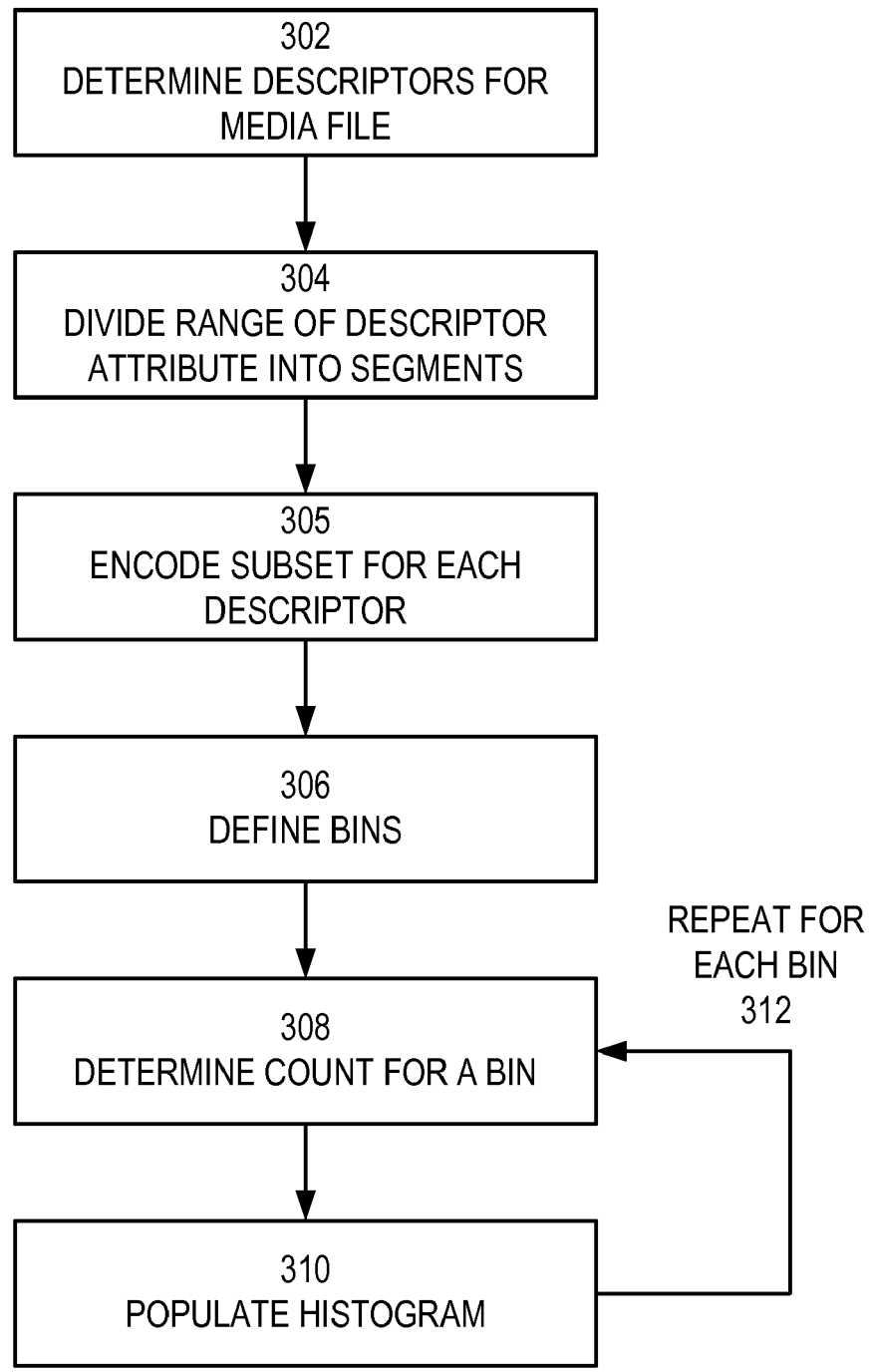
FIG. 3A illustrates one embodiment of a method for generating a histogram for a media file based on coarse encoding of the media file.

FIG. 3A is a flowchart illustrating one embodiment of a process 300 implemented by the histogram generator 125 to generate an encoding-based histogram 225 for a media file. Other embodiments can perform one or more steps of the process 300 in a different sequence. Moreover, other embodiments can include additional and/or different steps than the ones described herein.

The histogram generator 125 determines 302 descriptors for the media file. As used herein, a descriptor is a data element which characterizes one or more features of the input media data (e.g., edge locations and magnitudes, luminance features, and temporal gradients for video data). The descriptors determined by the histogram generator 125 can be single-dimensional or can be multi-dimensional. Also, the determined descriptors can have both a magnitude and a sign. In one embodiment, the determined descriptors are transform coefficients produced by transforming the media data included in the media file using a conventional media transform such as a Haar wavelet transform. Other types of transforms can be applied such as, for example, a Gabor transform or other related transform. The histogram generator 125 can apply the above-listed or other transform techniques using boxlets, summed-area tables, or integral images. Determining 302 the descriptors using a media transform transforms the representation of the video from the pixel domain to the transform coefficient domain. The descriptors can also be determined 302 by transforming the media data included in the media file using a conventional feature detection algorithm such as the SIFT algorithm. Other feature detection algorithms can also be used.

The histogram generator 125 coarsely encodes the determined descriptors with respect to at least one descriptor attribute by dividing 304 the range over which the attribute can vary into multiple segments and encoding 305 a segment of the range for each descriptor based on the attribute. For example, in one embodiment each determined descriptor is associated with a precise spatial and/or temporal position within the media file. The position is therefore an attribute of the determined descriptor. However, rather than encode the precise position of the determined descriptor, the histogram generator 125 divides 304 the range of possible positions into multiple segments and encodes 305 the segment (e.g., the coarse position) to which the descriptor corresponds. Coarsely encoding a particular descriptor attribute in this manner causes the final output of the robust hashing procedure to be robust with respect to (i.e., minimally sensitive to variations in) that particular descriptor attribute.

Figure 3B:
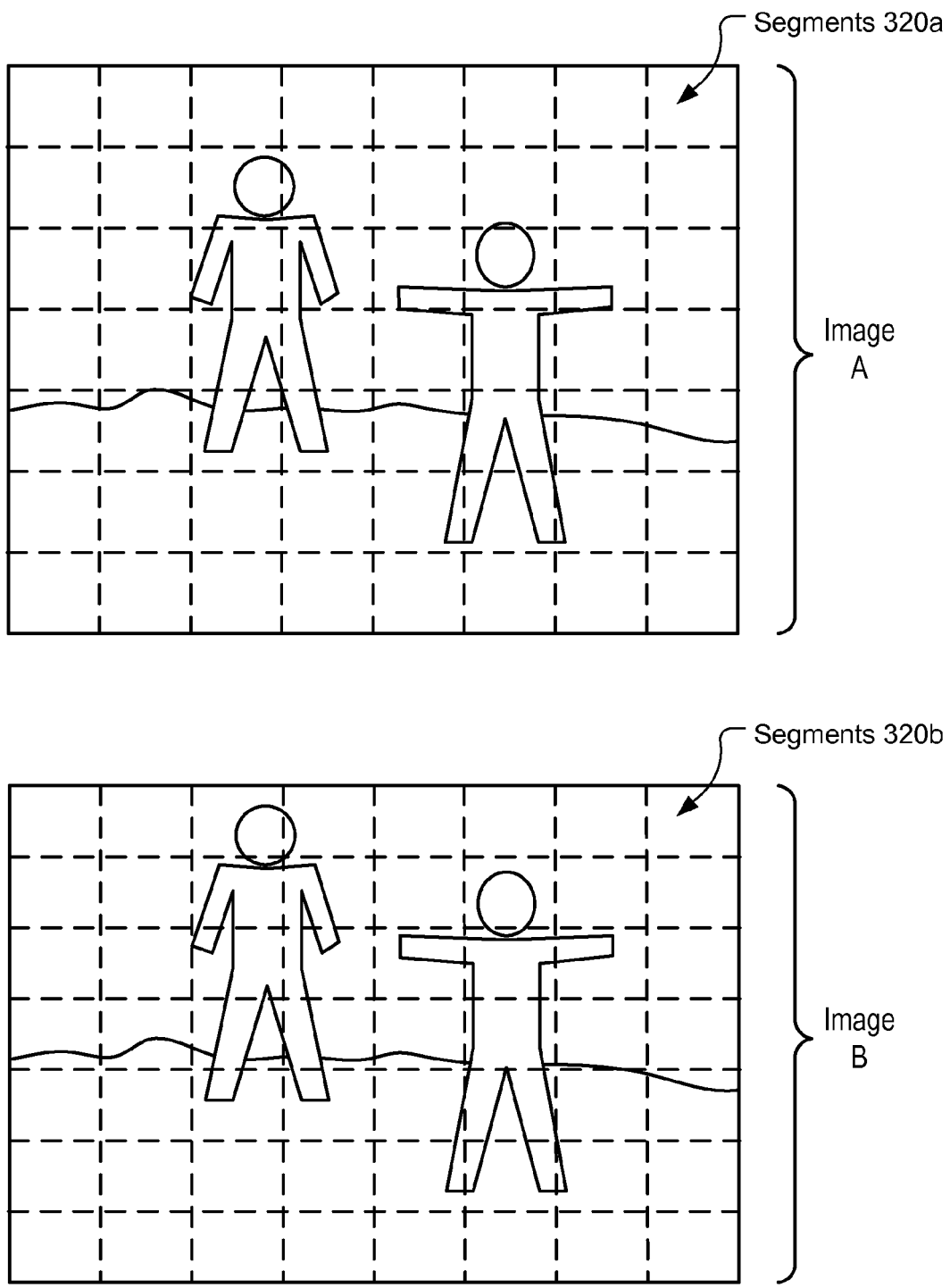
FIG. 3B illustrates segments of a media file according to one embodiment.

As an example, the two example media files comprising near-duplicate images illustrated in FIG. 3B can be considered. Image A and image B both represent the same frame, but image B is a crop of image A, with the top portion of image A absent from image B. Conventional near-duplicate detection and hashing techniques may fail to identify image A and image B as near duplicates because, for example, the wavelet coefficients or other conventional descriptors for the features common to both images may be associated with different precise positions within the images or have differing offsets relative to other features of the images. However, if the histogram generator 125 divides 304 each image into multiple segments 320, each segment 320 representing a subset of the range of possible positions, determined descriptors for the images may be associated with the same segment 320 despite having precise positions which differ. The histogram generator 125 can pair segments 320 for two media files based on the manner in which the range for the attribute to be coarsely encoded was divided 304. For example, the top left segment 320 of image A corresponds to the top left segment 320 of image B. Attributes other than position can be coarsely encoded for a media file. For example, frequency information associated with wavelets can be coarsely encoded. Similarly, scale and orientation can be coarsely encoded for feature descriptors. Furthermore, a feature descriptor can itself be coarsely encoded by the histogram generator 125 (e.g. vector quantization can be applied to a SIFT descriptor using a number of conventional techniques such as the K-Means or the Hierarchical K-Means algorithms.

Figure 3C:
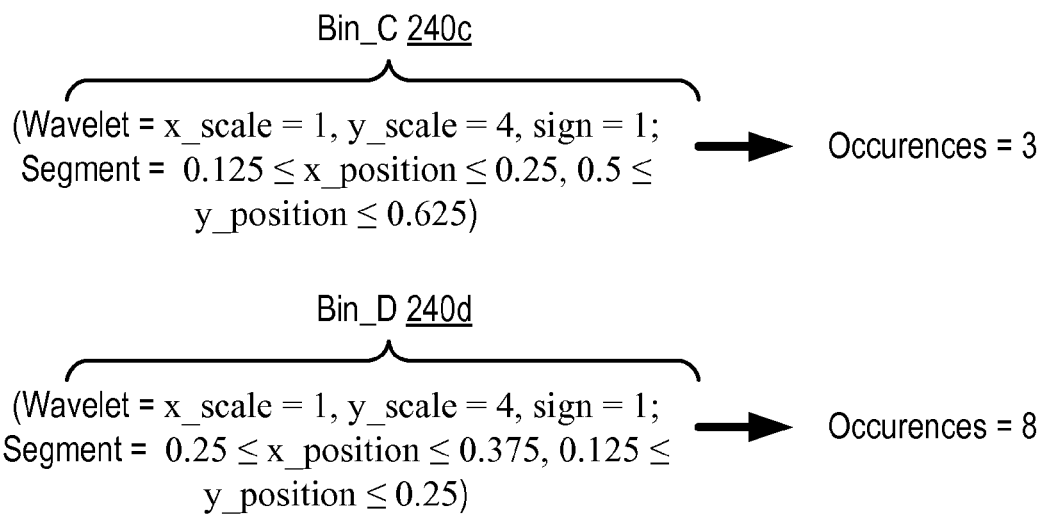
FIG. 3C illustrates bins for a histogram for a media file based on coarse encoding of the media file according to one embodiment.
Figure 3D:
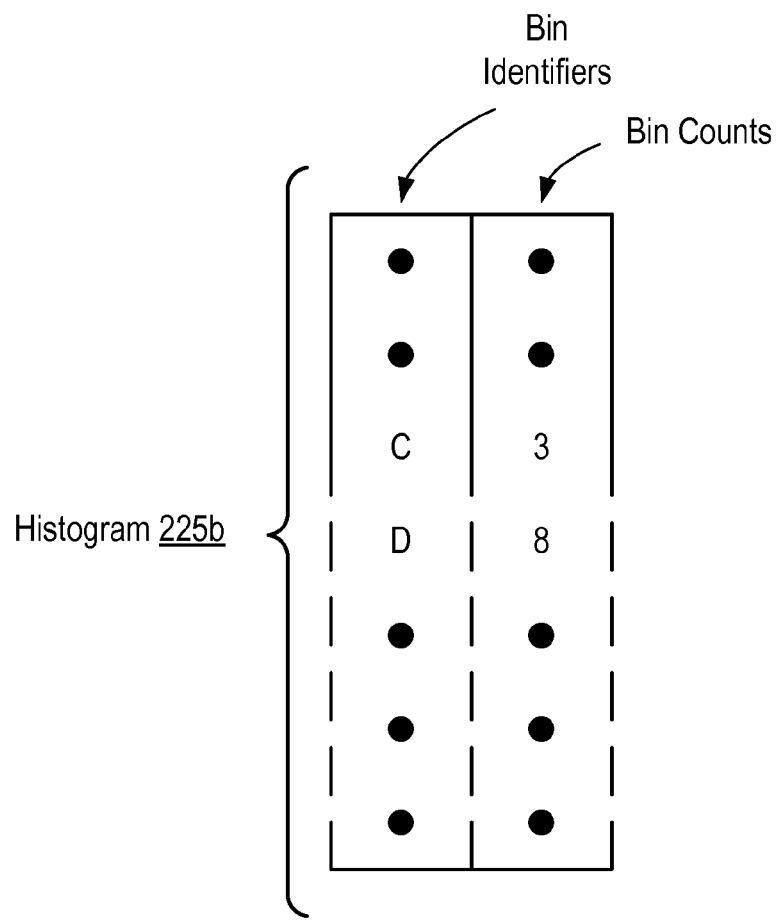
FIG. 3D illustrates one embodiment of a histogram for a media file based on coarse encoding of the media file.

The histogram generator 125 defines 306 a plurality of bins 240 in a manner similar to the defining 206 step described above in reference to FIG. 2A. However, for an encoding-based histogram 225b as shown in FIG. 3D, the bins 240 are based on the segments encoded for the determined descriptors, each bin 240 comprising a tuple of identifying a descriptor and a segment. For example, as shown in FIG. 3C, one bin 240c can correspond to a two-element tuple {Wavelet=(x_scale=1, y_scale=4, sign=1), Segment=(0.125$\leq$x position$\leq$0.25, 0.5$\leq$y position$\leq$0.625)} in which the first element identifies a determined descriptor (e.g., a particular wavelet) and the second element indicates a segment 320 of the media file (e.g., a particular temporal and/or spatial portion of a video). Similarly, another bin 240c can correspond to another two-element tuple in which the first element identifies the determined descriptor and the second element indicates another segment 320 of the media file.

The histogram generator 125 then determines 308 a count for each bin 240, populates 310 the histogram 225 with the determined count, and repeats 312 the determining 308 and populating 310 steps for each defined bin 240 associated with the media file to complete the histogram 225b for the media file. However, for the encoding-based histogram 225b, the determined count for a bin 240 represents a number of occurrences for the identified descriptor encoded as corresponding to the identified segment 320. For example, in FIGS. 3C and 3D, the histogram generator 125 has determined 308 a count of "3" for bin C, indicating that 3 occurrences of the descriptor corresponded to the segment 320. The histogram generator 125 has also determined 308 a count of "8" for bin D, indicating that 8 occurrences of the descriptor corresponded to the other segment 320.

Hence, in one embodiment, the histogram 225 for the media file is a multi-dimensional array with at least a first dimension corresponding to a plurality of bins 240, each bin 240 representing a set of one or more features of the media file (e.g., a particular descriptor corresponding to a particular segment 320 of the media file), and at least a second dimension corresponding to a plurality of bin counts, each bin count representing a number of occurrences for an associated bin 240.

Additional Histogram Considerations

The histogram generator 125 can also generate a histogram for a media file using any combination of the version-based techniques described above in reference to FIGS. 2A-2D and the encoding-based techniques described above in reference to FIGS. 3A-3D. For example, the histogram generator can create 202 many randomized versions of the media file, process each randomized version as described above in reference to steps 302, 304, and 305 of FIG. 3A, and then apply 204 a hash function to the coarsely encoded descriptors for each randomized version. Alternatively, the histogram generator can determine 302 descriptors for the media file, divide 304 a range of possible values for an attribute of the determined descriptors in a plurality of segments, coarsely encode 305 the determined descriptors based on the segments to create a file of coarsely encoded 305 media data, and then execute the process 200 of FIG. 2A upon the file of coarsely encoded media data rather than the original media file.

Hashing of Histograms

Figure 4A:
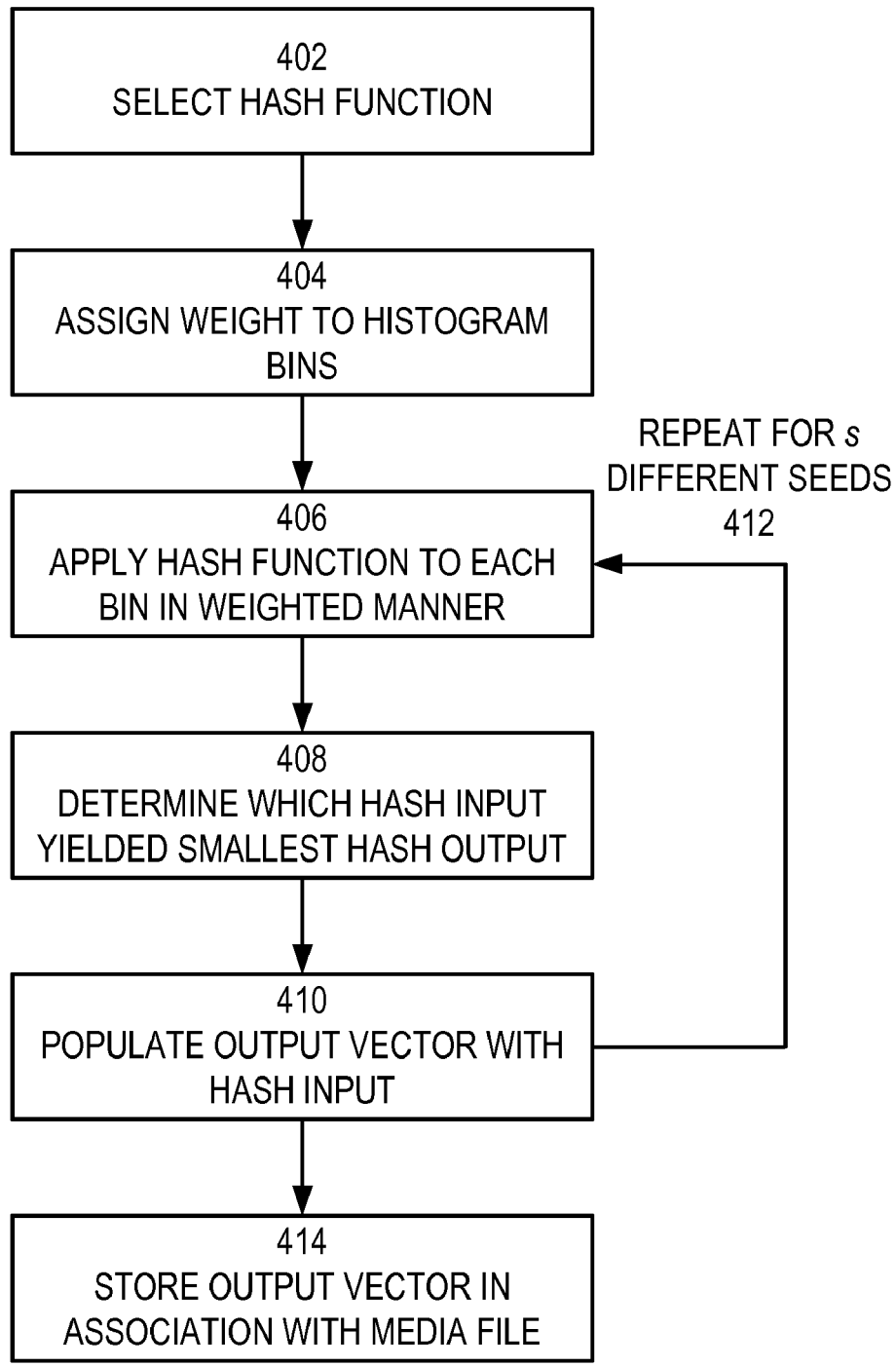
FIG. 4A illustrates one embodiment of a method for hashing a histogram of a media file.

The histogram hashing module 130 transforms data included in a histogram 225 for a media file into an output vector which, when associated with the media file, can serve as a fingerprint or signature for the media file and provide a basis for comparisons involving the media file as part of a near-duplicate detection algorithm. In one embodiment, the histogram hashing module 130 applies a weighted min-hash procedure to the histogram 225 to generate the output vector. FIG. 4A illustrates a flowchart of one embodiment of a weighted min-hash procedure 400 implemented by the histogram hashing module 130 to hash the histogram 225. Other embodiments can perform one or more steps of FIG. 4A in a different sequence. Moreover, other embodiments can include additional and/or different steps than the ones described herein.

First, the histogram hashing module 130 selects 402 a hash function to apply to the histogram 225 data. The selected hash function is a conventional hash function such as, for example, a Jenkins hash function, a Bernstein hash function, a Fowler-Noll-Vo hash function, a MurmurHash hash function, a Pearson hashing function, or a Zobrist hash function. The selected hash function is a seeded hash function. As previously stated, a seeded hash function is a function that accepts two inputs, e.g., f(X, Y). The first input X is a set of data (e.g., 32 bits of data), and the second input Y is a seed value. The seed value is typically a number (e.g., 1, 2, 3 . . . ). The selected hash function treats X and Y as a pair, outputting a hash value that is affected by both X and Y. The output of the hash function is a single real number, such as an integer. In one embodiment, when hashing a version-based histogram 225a, the hash functions that are applied 204 by the histogram generator 125 and the hash function that is selected 402 by the histogram hashing module 130 influence how robust the output of the weighted min-hash procedure 400 is with respect to a particular media data attribute as well as how discriminative the output of the weighted min-hash procedure 400 is with respect to the particular media data attribute. For an encoding-based histogram 225b, the extent to which the particular media data attribute is quantized also affects these properties.

The histogram hashing module 130 then assigns 404 a weight w to each bin 240 included in the histogram 225. In one embodiment, the weight 404 assigned to a bin 240 is the bin count associated with the bin 240. Hence, referring the histogram 225 of FIG. 2D, the histogram hashing module 130 would assign 404 a weight w=22 for the bin 240 identified as "A", would assign 404 a weight w=75 for the bin 240 identified as "B", and so on until each bin 240 of the histogram 225 has an assigned 404 weight. The weight assigned 404 to a bin 240 can also be a transform of the associated bin count (e.g., a square root of the bin count). The assigned weight can also be constrained between a minimum value and a maximum value to limit the influence of any individual bin 240. Additionally, the weight assigned 404 to a bin 240 can be based on a global importance of the media data feature specified by the bin 240. For example, a bin 240 of an encoding-based histogram 225 can be assigned 404 a weight based at least in part on a pre-determined global importance of the feature descriptor specified by the bin 240 (e.g., the inverse document frequency of the specified feature descriptor).

The histogram hashing module 130 applies 406 the selected hash function to each bin 240 in a weighted manner. The data from a bin 240 that is input to the applied hash function comprises a sequence of bits representative of the bin 240. For example, in one embodiment, the data for a bin 240 that is input to the applied hash function comprises a 64-bit sequence obtained by representing each element of a tuple used to define the bin 240 (e.g., the hash function and output value associated with the bin 240 or the feature descriptor and segment 320 associated with the bin 320) as a number and then applying a hash (e.g., Jenkins hash) to the numbers to generate a 64-bit sequence. In another embodiment, the bin 240 is treated as a string of ASCII characters (e.g., the ASCII characters corresponding to "hash function 1, output value 10" or "Wavelet=(x_scale=1, y_scale=4, sign=1), Segment=(0.125≦x position≦0.25, 0.5≦y position≦0.625)"), and the hash function is applied 406 to the string. Also, data for the bin 240 can serve to initialize a conventional random number generator, such as a linear congruential generator, and the output of the random number generator can comprise a sequence of bits to which the hash function is applied 406.

In one embodiment, applying 406 the hash function to a bin 240 in a weighted manner comprises applying 406 the hash function with a constant seed value to w versions of the bin 240. For example, the histogram hashing module 130 can apply 406 the selected hash function to 22 versions of bin A from FIG. 2D, can apply 406 the selected hash function to 75 versions of bin B from FIG. 2D, and so on until the hash function has been applied 406 to one or more versions of each bin 240 of the histogram 225, the number of versions for a bin 240 equal to the assigned weight w. As stated previously, by applying the hash function to more versions of the higher-weighted bins, the robust hashing procedure can be more discriminative with respect to those features that are more prevalent in the media data.

In one embodiment, a first version of a bin 240 is created by appending an entry of "1" to the data included in the bin 240, a second version of the bin 240 is created by appending an entry of "2" to the data included in the bin 240, and so on. In another embodiment, a first version of a bin 240 is a first permutation of the data included in the bin 240, a second version of the bin 240 is a second permutation of the data included in the bin 240, and so on. As used herein, a permutation is produced by treating the data for the bin 240 as a vector and rearranging the elements of the vector according to a specified sequence. The sequence comprises an ordered set of integers in which each integer specifies an element from the original vector used to populate the element of the rearranged vector corresponding to the location of the integer within the sequence. For example, a permutation of the vector [A,B,C,D,E] according the sequence (2,4,1,5,3) results in the rearranged vector [B,D,A,E,C] because the sequence (2,4,1, 5,3) specifies that the $1^{st}$ element of the re-arranged vector is assigned the value of the $2^{nd}$ element of the original vector, the $2^{nd}$ element of the re-arranged vector is assigned the value of the $4^{th}$ element of the original vector, the $3^{rd}$ element of the re-arranged vector is assigned the value of the $1^{st}$ element of the original vector, and so on. The w sequences used to produce w permutations of each bin 240 are typically fixed and applied in the same order to each bin 240 of every histogram 225 hashed by the histogram hashing module 130.

After applying 406 the selected hash function to each bin 240 in a weighted manner, the histogram hashing module 130 determines 408 which input to the hash function resulted in the smallest output and populates 410 an output vector 450 with the determined 408 hash input. The histogram hashing module 130 then repeats the applying 406, determining 408, and populating 410 steps for a number s of different seeds for the selected hash function. Once the output vector 450 is fully populated 412, the histogram hashing module 130 stores 414 the output vector 450 in association with the media file in the hash output database 155 to be used at a later time to determine whether the media file matches a second media file. In one embodiment, the media hosting service 100 uses the output vector 450 as a digital fingerprint for the media file, allowing the media hosting service 100 to perform near-duplicate detection and similar tasks based on the output vector 450 associated with each media file.

Figure 2D:
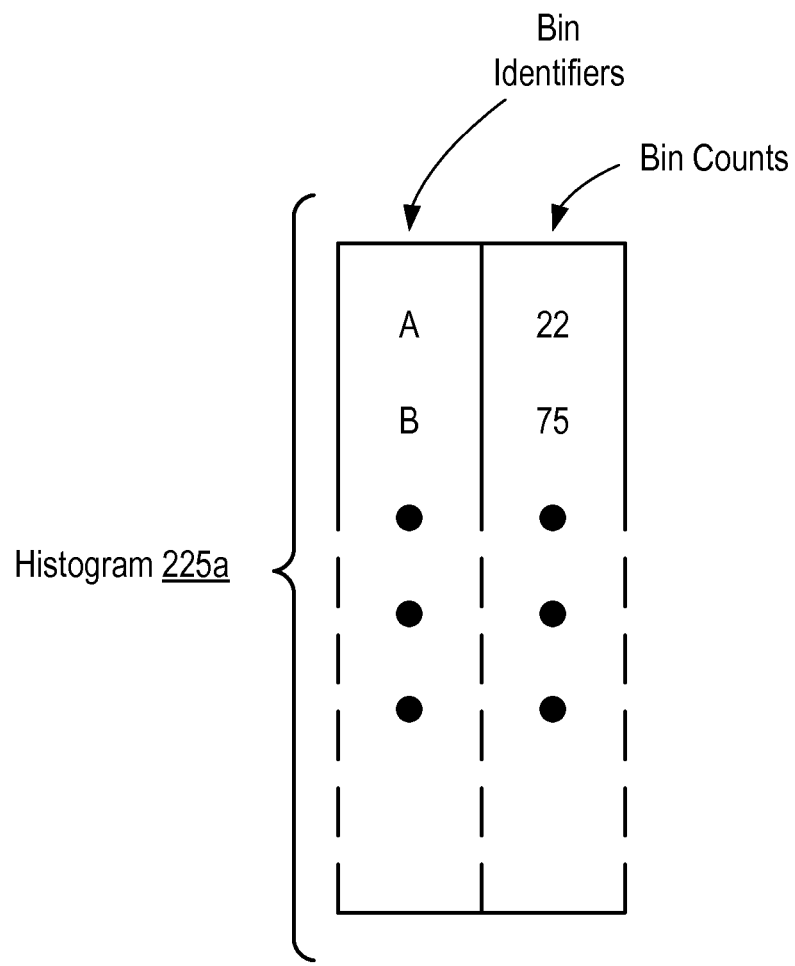
FIG. 2D illustrates one embodiment of a histogram for a media file based on multiple versions of the media file.
Figure 4B:
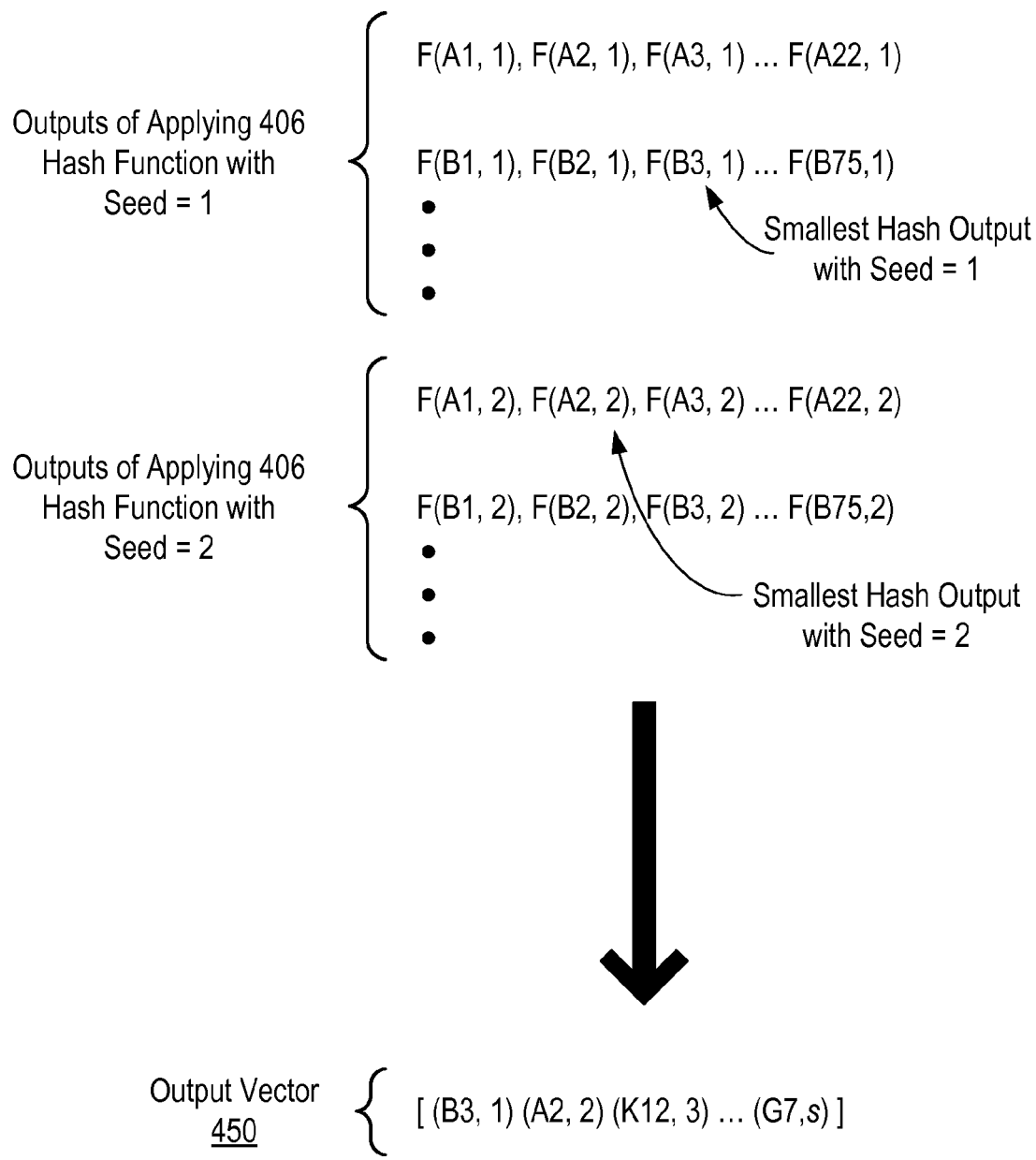
FIG. 4B illustrates further aspects of one embodiment of a method for hashing a histogram of a media file.

FIG. 4B illustrates aspects of the weighted min-hash procedure 400 depicted in FIG. 4A as applied to the example histogram 225 of FIG. 2D and includes an example output vector 450. In FIG. 4B, "F(A1, 1)" indicates the output of the selected hash function for inputs "A1" and "1" wherein A1 is a first version of bin A from FIG. 2D and "1" is a seed value, "F(A2, 1)" indicates the output of the selected 402 hash function for inputs "A2" and "1" wherein A2 is a second version of bin A from FIG. 2D and "1" is a seed value, and so on. The output of the applied hash function comprises a single number, and in one embodiment is a 32-bit number.

As shown in FIG. 4B, applying 406 the selected hash function to w versions of each bin 240 of the histogram 225 can result in a very large number of hash outputs. For example, there are 22 hash outputs for the 22 versions of bin A from FIG. 2D, 75 hash outputs for the 75 versions of bin B from FIG. 2D, and so on for each of the s seeds. For visual clarity, a few hash outputs are illustrated in FIG. 4B, but as indicated by the ellipsis and vertical dots, applying 406 the selected hash function to w versions of each bin 240 of the histogram 225 can result in many more hash outputs.

As previously described, the histogram hashing module 130 determines 408 which hash input resulted in the smallest hash output and populates the output vector 450 with that determined 408 hash input. In FIG. 4B for example, a case is illustrated in which applying 406 the selected hash function in a weighted manner with a constant seed of 1 yielded the smallest hash output when the other input was the third version of bin B from FIG. 2D. Hence, the first entry of the output vector 450 encodes the tuple (B3, 1). In the case illustrated by FIG. 4B, applying 406 the selected hash function in a weighted manner with a constant seed of 2 yielded the smallest hash output when the other input was the second version of bin A from FIG. 2D, the second entry of the output vector 450 encodes the tuple (A2, 2). Ultimately, the histogram hashing module 130 repeats the applying 406, determining 408, and populating steps 410 s times with s different seeds. The output vector for the media file is therefore a vector comprising s entries wherein each entry encodes which version of which bin 240 resulted in the smallest hash function output for the corresponding seed. In one embodiment, s is eighty, and eight bytes is used to encode each entry, so the output vector 450 comprises 640 bytes (eight entries at eight bytes each). Other values of s are possible, and each entry of the output vector 450 can be encoded using a different amount of data.

Thus, in one embodiment the output vector 450 comprises a single data element that represents features of throughout the entire duration of the media file. Although the media file can comprise several tens or even hundreds of megabytes of data, the output vector 450 can be only tens or hundreds of bytes.

Processing of Output Vectors

Figures 5A, 5B:
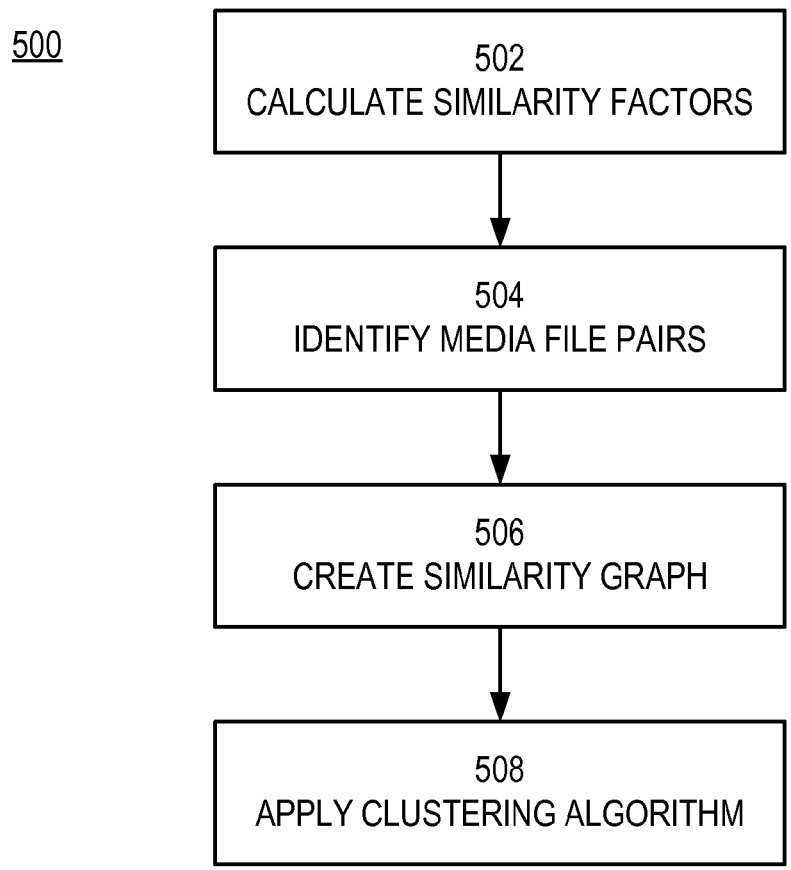
FIG. 5A illustrates one embodiment of a method for generating clusters of media files based on output vectors produced by hashing histograms of the media files.
FIG. 5B illustrates output vectors for media files in accordance with one embodiment.

In one embodiment, the clustering module 135 detects near-duplicate media files in the media database 140 based on the corresponding output vectors 450 stored in the hash output database 155. The clustering module 135 processes the output vectors 450 in the hash output database 155 to generate a plurality of clusters, each cluster representing a group of similar media files. FIG. 5A illustrates a flowchart of one embodiment of a clustering procedure 500 implemented by the clustering module 135. Other embodiments can perform one or more steps of the clustering procedure 500 in a different sequence. Moreover, other embodiments of the clustering procedure 500 can include additional, fewer, and/or different steps than the ones described herein.

The clustering module 135 compares output vectors 450 for two media files by calculating 502 a similarity factor for the pair of media files. In one embodiment, the similarity factor for a media file pair is a variation of a Hamming distance metric calculated 502 based on the corresponding output vectors 450. As described above, each output vector 450 has multiple entries. The clustering module 135 evaluates two output vectors 450 and determines a percentage of their entries that match. For example, the clustering module 135 determines how many matching entries are included in the output vectors 450 being evaluated and divides the number of matching entries by the number of entries included in each output vector 450.

To help further explain calculation 502 of a similarity factor, FIG. 5B illustrates an example of a first output vector 450a and an example of a second output vector 450b. The first output vector 450a and the second output vector 450b both comprise four entries. The second and third entries in the two output vectors 450a, 450b are equivalent. Thus, there are two matches for the output vectors 450a, 450b. The clustering module 135 can therefore calculate 502 a similarity factor for the two output vectors 450a, 450b of 0.50, 50%, or some other equivalent.

After calculating 502 similarity factors for all pairs of media files stored in the media database 140 based on the corresponding output vectors 450 stored in the hash output database 155, the clustering module 135 identifies 504 those media file pairs having a similarity factor above a threshold. In one embodiment, the clustering module 135 employs a locality-sensitive hashing (LSH) algorithm to identify 504 the sufficiently similar media files. Other conventional matching techniques suitable for identifying 504 similar items within large quantities of data to, such as nearest neighbor search techniques based on kd-trees or spill trees, can also be utilized by the clustering module 135.

Based on the identified 504 media file pairs, the clustering module 135 creates 506 a similarity graph comprising nodes corresponding to media files and edges between the nodes that signify a similarity between the connected media files. In one embodiment, all edges have equal significance, and the presence of an edge between two media files simply indicates that the calculated 502 similarity factor for the two media files exceeded the threshold. The clustering module 135 can also create 506 a similarity graph comprising edges between pairs of media files whose similarity factor does not exceed the threshold. For example, if media file A is sufficiently similar to media file B, and media file B is sufficiently similar to media file C, an edge can be included between media file A and media file C even if their calculated 502 similarity factor is below the threshold. Edges within the created 506 graph can also be weighted based on the corresponding similarity factor (e.g., the weight of an edge is proportion to the corresponding similarity factor).

The clustering module 135 then applies 508 a clustering algorithm to the media files. In one embodiment, the clustering module 135 applies a leader clustering algorithm. Leader clustering comprises arranging the media files in a sequence, the sequence based on any suitable attribute (e.g., alphabetical by title, sequential by date and time of upload, sequential by size, etc.). Once the media files are arranged, the first media file is placed into a first cluster with all media files to which the first media file is sufficiently similar. The media files included in the first cluster are removed from the sequence. This process of assigning media files to clusters is repeated until the sequence is empty. In one embodiment, the clustering module 135 assigns a unique cluster ID to each generated cluster Once the set of clusters has been generated by the clustering module 135, each media file ingested by the media hosting service 100 can be analyzed to see if it corresponds to one of the previously generated clusters by generating an output vector 450 for the ingested media file as described above and comparing the output vector 450 to previously generated output vectors 450. The clustering module 135 can then append or modify metadata associated with the ingested media file to indicate if it is a near-duplicate media file and, if so, identify which other media files for which it is a near duplicate. For example, the clustering module 135 can modify the metadata to include a cluster ID associated with one of the previously generated clusters.

As previously described, such metadata can help the media hosting service 100, for example, provide improved searching and browsing capabilities (e.g., by not presenting to the user an excessive number of near-duplicate results in response to a query), propagate metadata among media files, or identify media files as suitable for various management policies (e.g., media files suitable for monetization via a particular advertisement or subscription policy, media files which should be eliminated from the media database 140, etc.).

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for robustly hashing media data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a fingerprint for a media file, the method executed by at least one computer system and comprising:

creating by the at least one computer system, a plurality of randomized versions of the media file, each randomized version of the media file altered to a random extent with respect to an attribute of the media file;

generating, in a memory of the at least one computer system, a histogram from the plurality of randomized versions of the media file, the histogram having a plurality of bins each associated with a different feature of the media file, and each bin storing a count of the randomized versions of the media file that have the feature associated with the bin, wherein generating the histogram comprises:

creating the plurality of bins in the memory of the at least one computer system, wherein each of the plurality of bins is associated with (1) a particular hash function included in a set of hash functions; and (2) a particular output value for the particular hash function given an input comprising one of the randomized version of the media file; applying the set of hash functions to each randomized version of the media file; and determining the count of the randomized media versions of the media file for each defined bin, each count indicating a number of randomized versions that resulted in the particular output value from the particular hash function;

generating the fingerprint for the media file based on the histogram; and storing the fingerprint to a computer-readable storage medium.

2. The method of claim 1, wherein the randomized attribute comprises an amount of media data to be cropped from the media file.

3. The method of claim 1, further comprising:

creating a number of altered versions of each bin;

applying a first hash function to the number of altered versions of each bin to generate a plurality of outputs for the first hash function;

determining a smallest output for the first hash function; and storing a first data element representative of the altered version that yielded the determined smallest output for the first hash function.

4. The method of claim 3, wherein the number of altered versions of a bin is based on the count determined for the bin.

5. The method of claim 3, wherein the number of altered versions of a bin is based on a global weight associated with a set of features specified by the bin.

6. The method of claim 3, further comprising:

applying a second hash function to the number of altered versions of each bin to generate a plurality of outputs for the second hash function;

determining a smallest output for the second hash function; and storing a second data element representative of the altered version that yielded the determined smallest output for the second hash function.

7. The method of claim 6, wherein the first hash function and the second hash function are part of a family of hash functions, the first hash function having a first seed value and the second hash function having a second seed value.

8. The method of claim 6, further comprising:

assigning the media file to a cluster of media files based on an output vector comprising at least the first and second data elements.

9. The method of claim 8, wherein assigning the media file to a cluster of media files based on the output vector comprises:

calculating a number of matching entries for the output vector for the media file and a second output vector for a second media file.

10. A non-transitory computer-readable storage medium storing computer-executable code, the computer-executable code when executed by a processor causing the processor to perform a process for generating a fingerprint for a media file, the process comprising:

creating a plurality of randomized versions of the media file, each randomized version of the media file altered to a random extent with respect to an attribute of the media file;

generating a histogram from the plurality of randomized versions of the media file, the histogram having a plurality of bins each associated with a different feature of the media file, and each bin storing a count of the randomized versions of the media file that have the feature associated with the bin, wherein generating the histogram comprises:

creating the plurality of bins in the memory of the at least one computer system, wherein each of the plurality of bins is associated with (1) a particular hash function included in a set of hash functions; and (2) a particular output value for the particular hash function given an input comprising one of the randomized version of the media file;

applying the set of hash functions to each randomized version of the media file; and determining the count of the randomized media versions of the media file for each defined bin, each count indicating a number of randomized versions that resulted in the particular output value from the particular hash function;

generating the fingerprint for the media file based on the histogram; and storing the fingerprint.

11. The computer-readable storage medium of claim 10, wherein the randomized attribute comprises an amount of media data to be cropped from the media file.

12. The computer-readable storage medium of claim 10, wherein the process further comprises:

creating a number of altered versions of each bin;

applying a first hash function to the number of altered versions of each bin to generate a plurality of outputs for the first hash function;

determining a smallest output for the first hash function; and storing a first data element representative of the altered version that yielded the determined smallest output for the first hash function.

13. The computer-readable storage medium of claim 12, wherein the number of altered versions of a bin is based on the count determined for the bin.

14. The computer-readable storage medium of claim 12, wherein the number of altered versions of a bin is based on a global weight associated with a set of features specified by the bin.

15. The computer-readable storage medium of claim 12, further comprising:

applying a second hash function to the number of altered versions of each bin to generate a plurality of outputs for the second hash function;

determining a smallest output for the second hash function; and storing a second data element representative of the altered version that yielded the determined smallest output for the second hash function.

16. The computer-readable storage medium of claim 15, wherein the first hash function and the second hash function are part of a family of hash functions, the first hash function having a first seed value and the second hash function having a second seed value.

17. The computer-readable storage medium of claim 15, the process further comprising:

assigning the media file to a cluster of media files based on an output vector comprising at least the first and second data elements.

18. The computer-readable storage medium of claim 17, wherein assigning the media file to a cluster of media files based on the output vector comprises:

calculating a number of matching entries for the output vector for the media file and a second output vector for a second media file.

19. A method for generating a fingerprint for a media file, the method executed by at least one computer system and comprising:

determining a plurality of feature descriptors for the media file, the feature descriptors each associated with a position within the media file;

coarsely encoding the position of the determined feature descriptors within the media file to determine a segment associated with each of the feature descriptors, the segment comprising a range of possible positions;

generating, in a memory of the computer system, a histogram for the media file, the histogram having a plurality of bins each associated with a different segment of the media file, and each bin storing a count of the feature descriptors associated with the segment;

creating a number of altered versions of each bin in the histogram;

applying a first hash function to the number of altered versions of each bin to generate a plurality of outputs for the first hash function;

determining a smallest output for the first hash function;

storing a first data element representative of the altered version that yielded the determined smallest output for the first hash function;

generating the fingerprint for the media file based on the stored first data element; histogram; and storing the fingerprint to a computer-readable storage medium.

20. The method of claim 19, wherein the number of altered versions of a bin is based on the count determined for the bin.

21. The method of claim 19, wherein the number of altered versions of a bin is based on a global weight associated with a set of features specified by the bin.

22. The method of claim 19, further comprising:

applying a second hash function to the number of altered versions of each bin to generate a plurality of outputs for the second hash function;

determining a smallest output for the second hash function; and storing a second data element representative of the altered version that yielded the determined smallest output for the second hash function.

23. The method of claim 22, wherein the first hash function and the second hash function are part of a family of hash functions, the first hash function having a first seed value and the second hash function having a second seed value.

24. The method of claim 22, further comprising:

assigning the media file to a cluster of media files based on an output vector comprising at least the first and second data elements.

25. The method of claim 24, wherein assigning the media file to a cluster of media files based on the output vector comprises:

calculating a number of matching entries for the output vector for the media file and a second output vector for a second media file.

26. A non-transitory computer-readable storage medium storing computer-executable code, the computer-executable code when executed by a processor causing the processor to perform a process generating a fingerprint for a media file, the process comprising:

determining a plurality of feature descriptors for the media file, the feature descriptors each associated with a position within the media file;

coarsely encoding the position of the determined feature descriptors within the media to determine a segment associated with each of the feature descriptors, the segment comprising a range of possible positions;

generating, in a memory of the computer system, a histogram for the media file, the histogram having a plurality of bins each associated with a different segment of the media file, and each bin storing a count of the feature descriptors associated with the segment;

creating a number of altered versions of each bin in the histogram;

applying a first hash function to the number of altered versions of each bin to generate a plurality of outputs for the first hash function;

determining a smallest output for the first hash function;

storing a first data element representative of the altered version that yielded the determined smallest output for the first hash function;

generating the fingerprint for the media file based on the histogram; and storing the fingerprint.

27. The computer-readable storage medium of claim 26, wherein the number of altered versions of a bin is based on the count determined for the bin.

28. The computer-readable storage medium of claim 26, wherein the number of altered versions of a bin is based on a global weight associated with a set of features specified by the bin.

29. The computer-readable storage medium of claim 26, further comprising:

applying a second hash function to the number of altered versions of each bin to generate a plurality of outputs for the second hash function;

determining a smallest output for the second hash function; and storing a second data element representative of the altered version that yielded the determined smallest output for the second hash function.

30. The computer-readable storage medium of claim 29, wherein the first hash function and the second hash function are part of a family of hash functions, the first hash function having a first seed value and the second hash function having a second seed value.

31. The computer-readable storage medium of claim 29, the process further comprising:

assigning the media file to a cluster of media files based on an output vector comprising at least the first and second data elements.

32. The computer-readable storage medium of claim 31, wherein assigning the media file to a cluster of media files based on the output vector comprises:

calculating a number of matching entries for the output vector for the media file and a second output vector for a second media file.

* * * * *